July 2, 1946.  E. SEPPELER  2,403,243
SYNCHRONIZING PROPELLER
Filed May 24, 1938  3 Sheets-Sheet 1
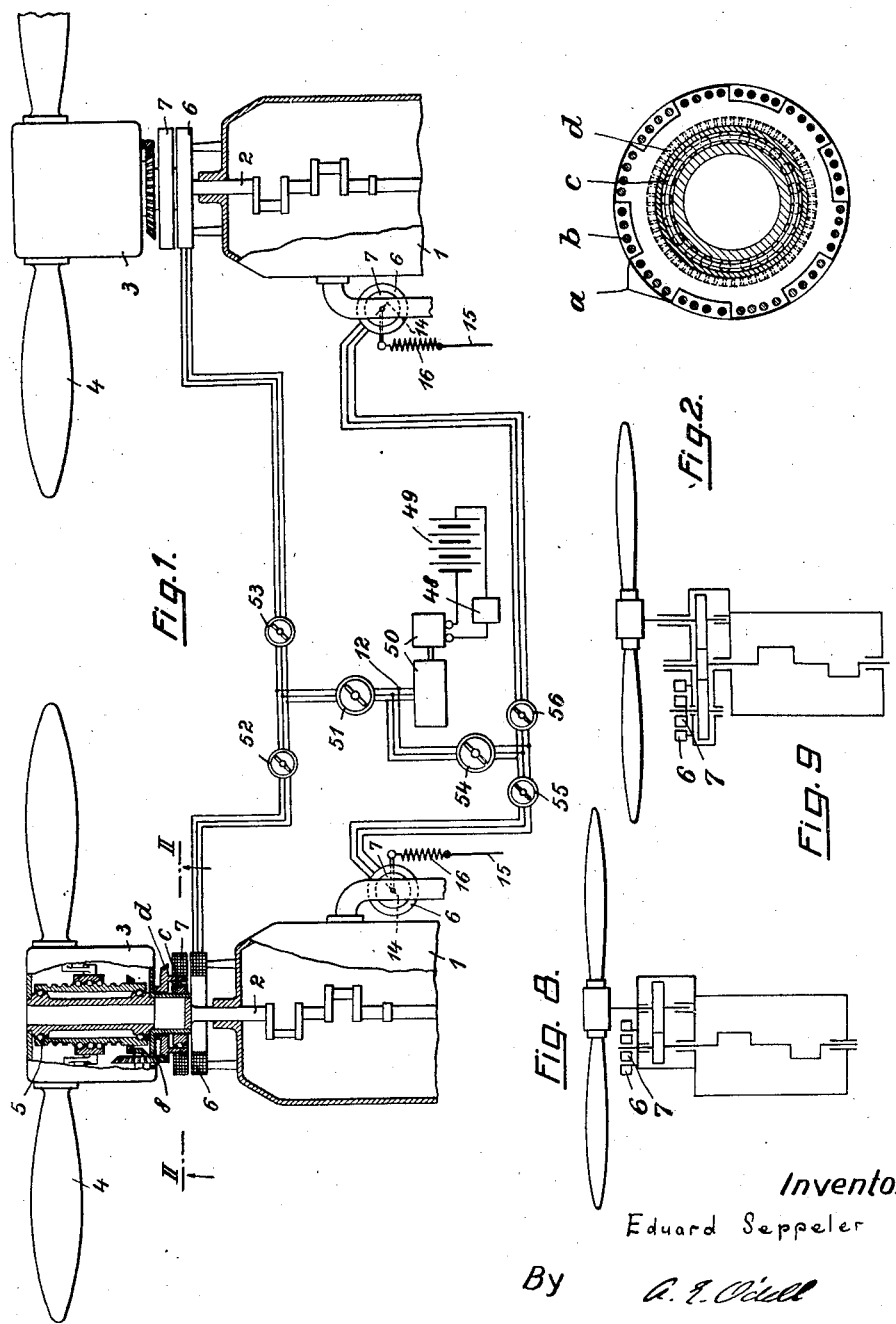
Inventor
Eduard Seppeler
By  A. E. Odell
Attorney July 2, 1946.  E. SEPPELER  2,403,243
SYNCHRONIZING PROPELLER
Filed May 24, 1938  3 Sheets-Sheet 2
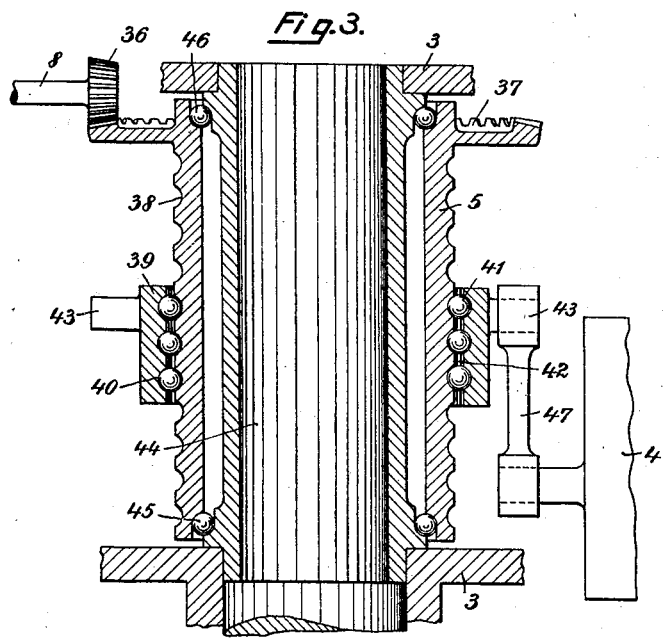
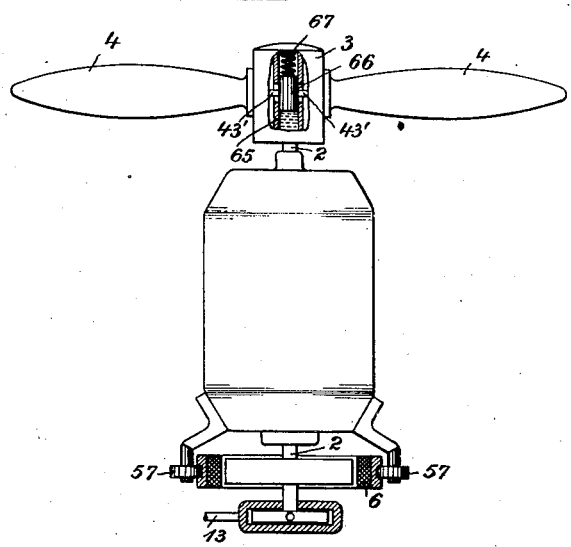
Inventor
Eduard Seppeler
By A. E. Odell
Attorney July 2, 1946.　　　E. SEPPELER　　　2,403,243
SYNCHRONIZING PROPELLER
Filed May 24, 1938　　　3 Sheets-Sheet 3

Inventor
Eduard Seppeler.
By
A. L. Odell
Attorney

Patented July 2, 1946

2,403,243

UNITED STATES PATENT OFFICE 2,403,243

SYNCHRONIZING PROPELLER

Eduard Seppeler, Berlin-Neukolln, Germany; vested in the Alien Property Custodian Application May 24, 1938, Serial No. 209,675
In Germany April 9, 1937

2 Claims. (Cl. 170—135.6)

This invention is a new method of and apparatus for regulating propeller speed on multiple propeller aircraft.

The principal purpose of the invention is to eliminate the torques and other stresses to which the aircraft is subjected when the propellers rotate at different speeds. Variations in the phase relation of the several propellers call forth stresses which may cause discomfort to passengers and undue strain on the aircraft. The invention therefore aims to keep the propellers rotating at the same speed and as nearly as possible in the same phase relation.

To this end the invention is based on and includes a novel method of control. Instead of the propeller speed being held constant by regulating the output of the engine driving it, the method of the invention is to make the pitch of each screw variable and to cause it to be varied in the one sense and the other according as and so long as the screw leads or lags in phase relatively to a common standard.

This method of control leaves to the pilot ability to vary the output of the several engines, and therefore of the several screws as may be required to suit flying conditions. He can, for example, increase the output of a propeller on one wing for the purpose of counteracting any cause of one-sided drag on the aircraft without concerning himself with the speed of the propeller which will be automatically maintained constant by the apparatus of the invention. In other words the invention enables the pilot to achieve by control of the engine alone what without the invention he could achieve only by first adjusting the pitch of a propeller and thereby causing a change in its speed and then adjusting the engine control to bring the propeller back to the same speed as the rest. Thus the invention makes it feasible to equip an aircraft with a great number of engines without increasing the difficulty of maintaining the necessary synchronism of the screws. Furthermore by adjustment of the common standard in relation to which the speed of the several screws is maintained the pilot can readily simultaneously alter the speed of all of them.

Many forms of pitch-adjusting mechanism are already known. To operate the pitch-adjusting mechanism the invention provides for each screw a device of the nature of a dynamo electric machine comprising relatively rotatable primary and secondary members. The standard speed at which the propellers are to be maintained is determined by an electric generator of adjustable but normally fixed frequency. This is ordinarily a polyphase generator connected with the primary of the pitch-adjusting dynamoelectric machine to produce in it a magnetic field rotating at a constant but adjustable speed. The secondary member of the pitch-adjusting machine is driven with the screw, either at the same speed or at any fixed ratio to the propeller speed. It is designed to react with the field of the primary member so as to tend to rotate at the speed of the rotating field and in definite phase relation to that field, a relation which may be described as zero phase difference when no force restrains the secondary member from keeping pace with the field. In any other relation than zero phase difference a torque arises between the primary and secondary members, as in any synchronous motor, and this is utilised to operate a pitch-adjusting mechanism.

The torque need not be directly applied to the pitch adjusting mechanism; a servo motor can be used, and the torque of the dynamoelectric machine employed merely to control the servomotor. Thus the dynamo-electric machine need not be capable of delivering substantial power; it may be rather of the nature of an instrument.

By reversal of the excitation of the dynamoelectric machine the regulating action may be reversed, for example to bring the propellers to the position for gliding.

The polyphase generator may also be used to control the engines, for example by governing the throttle or fuel supply, the pressure of the supercharger or otherwise, for which purpose the throttle or other adjunct is fitted with operating means which shift on variation of the speed of the polyphase generator or on reversal of its output.

In general an apparatus according to the invention may comprise the following elements: first a generator of standard frequency, the frequency being adjustable by hand or automatically according to flying conditions, but remaining constant when adjusted; second, for each propeller a generator of what may be called screw frequency, that is to say of a frequency proportional to the speed of the propeller; third a device in which the standard frequency and the screw frequency are in effect compared; fourth a pitch-adjusting mechanism controlled by the frequency comparator and operating to increase the pitch when the screw frequency exceeds the standard frequency and to reduce the pitch when the screw frequency falls below the standard frequency; and finally a cut-out and reversing switch to put the apparatus out of action or to reverse its action.

The generator of standard frequency may be any alternating current generator, even such as a thermionic valve generator, but ordinarily will be a polyphase dynamo-electric generator.

So might be also the generator of screw frequency; but as will be seen hereinafter it may be no more than a rotating armature or rotating magnet, for a rotating magnetic field may fairly be said to have the frequency of the currents that would need to flow in a polyphase winding to produce it, even though in fact it is produced by rotation of a permanent magnet or one excited by direct current.

In the frequency comparator the generator of standard frequency and the generator of screw frequency co-act to produce a torque varying with the phase relation or difference in frequency of the two generators. This, too, though it may be constituted by a suitable thermionic valve network is ordinarily of the nature of a dynamo-electric machine. It has a primary and a secondary member, which may both be normally stationary, rotating magnetic fields being produced by connecting the stationary windings to the generator of standard frequency and the generator of screw frequency respectively. Alternatively the secondary member of the frequency comparator may be driven with the screw, and may then constitute the generator of screw frequency.

Examples of construction embodying the invention are illustrated in the accompanying drawings.

Figure 1 shows diagrammatically an installation controlling a plurality of screws.

Figure 2 is a section on the line II—II of Figure 1 of the secondary member of the pitch-adjusting dynamo-electric machine.

Figure 3 shows in axial section on a larger scale the pitch-adjusting mechanism of the screws of Figure 1.

Figure 4 illustrates the use of a servomotor for effecting the pitch adjustment.

Figures 8 and 9 illustrate alternative dispositions of the pitch-adjusting dynamo-electric machine in relation to the engine and screw to which it belongs.

Figure 5:
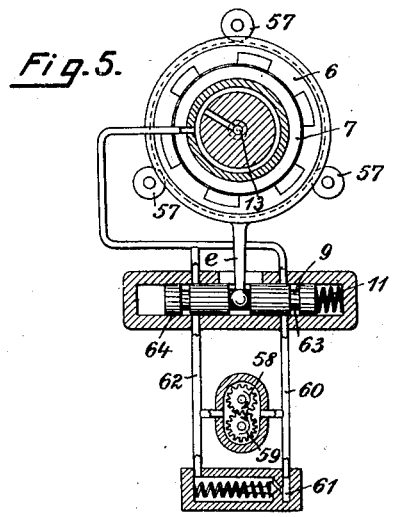
Figure 5 shows how the servomotor of Figure 4 is controlled by the pitch-adjusting dynamo-electric machine.

Figure 1 shows two engines 1 of an aircraft, their crank shafts 2 driving the hubs 3 of propellers 4. Each propeller has pitch-adjusting mechanism of which the first or operating member is a rotatable sleeve 5. This sleeve is carried in ball bearings 45, 46 (see Fig. 3) on the hollow shaft 44 of the hub 3, and can be turned through the medium of the gear teeth 37. On the outer surface of the sleeve are helical grooves 38 having a pitch of about 2%. Around the sleeve is a ring 39 having parallel circular grooves 40 on its inner surface. In the grooves 38 and 40, where they cross, are balls 41 which have no play in the grooves. The ring 39 is connected with the blades 4 for instance by links 47 pivoting on pins 43. Rotation of the sleeve 5 causes axial movement of the ring 39 and consequential variation of the blade pitch.

The apparatus for maintaining the propellers in synchronism and in nearly fixed phase relation, comprises first a generator of standard frequency 50, which may be regarded as a motor generator, a D. C. motor supplied from the battery 49 through control means 48 driving a polyphase generator. It comprises also a pitch-adjusting dynamo-electric machine for each screw, consisting of a primary member 6 and a secondary member 7. The former is fast upon the engine housing. The primary member carries a polyphase winding connected to the network 12 into which the generator 50 delivers three-phase current. In the network 12 a main cut-out and reversing switch 51 controls the connections to both primary members 6, and individual cut-out and reversing switches 52, 53 control the connections to each member respectively. The secondary member 7 is shown as rotatably mounted by a ball bearing c on the propeller shaft. It carries gear teeth d, geared to the teeth 37 on the sleeve 5 by gearing 8.

Electrically the secondary member 7 is designed to co-operate with the rotating magnetic field produced in the primary member 6, and to tend to rotate at the speed of and in nearly fixed phase relation to that field. For example as shown in Figure 2 it may have salient poles a, or poles permanently magnetized or excited by direct current. In addition, it is designed to have a substantial starting torque, that is to say there must be a substantial torque between primary and secondary members even when the latter is wholly out of step with the rotating magnetic field of the former. For this purpose it is equipped with a squirrel cage winding b.

If the propeller 4 is rotating at a speed exactly equal to the speed of the rotating field of 6, the secondary member 7 will turn in synchronism with the rotating field, and can assume (neglecting friction) what may be termed zero phase relation to it, that is to say such a phase relation that there is no torque exerted between the primary and secondary members. If the screw should turn faster the secondary member 7 will lead in phase relatively to the field of the primary member 6 and a retarding torque will be exerted upon it and will be transmitted by it through the gearing d, 8, 37 to the pitch-adjusting mechanism, which accordingly will increase the pitch of the propeller 4; increase of pitch will continue so long as the phase relation of 6 and 7 is changed; it will result in increase in the output of the screw which will therefore be slowed down to the constant speed determined by the generator of standard frequency 50. Similarly if the secondary member 7 lags the pitch will be reduced until the speed is brought up to the standard value.

When the propeller blades are adjusted by the aid of a gear as in Figure 1 the power needed varies from 0.01 to 0.25 H. P., according to the speed of adjustment, for screws up to 800 H. P. output. The need for this power may be seen from the following. If the propeller 4 leads or lags relatively to the rotor 7 its gear 8 rolls upon the teeth d of the rotor 7 in one direction or the other. The movement is opposed by frictional resistance in the gear and inertia of the blades, among other forces, which must balance the mutual action between the stator 6 and rotor 7. The rotor will then take power operating either in the direction of the rotating field of the stator or in the opposite direction, and if the propeller leads electrical energy will be generated in the stator 6, while if the propeller lags energy will be consumed. In the former case therefore the control machine 6, 7 will behave as a generator with respect to the supply mains of the aircraft; in the latter case it will behave as a loaded motor. To prevent loading of the mains the blades 4 may be so mounted that due to centrifugal force upon them or to the effect of eccentric masses or the like, they tend always to diminish their pitch. Then the propeller will tend always to lead the rotor 7 and the control machine will accordingly in general work as a generator.

The pitch adjustment may alternatively be effected by a servomotor, for example a hydraulic motor having a piston subjected to spring pressure on one side and oil pressure on the other. Such a scheme is shown in Figures 4 and 5. The servomotor is controlled by the pitch-adjusting dynamo-electric machine 5, 7, in this case by the primary member 6. The primary member, therefore, is not fixed to the engine casing as in Figure 1 but is rotatably mounted on it on rollers 57 which permit it to turn through the required angle. Upon the member 6 is secured an arm e which actuates the piston valve 9 of a servomotor consisting of a gear pump 58, 59 with a loaded by-pass 61, and a cylinder 65 in which moves a piston 66 under the action of a spring 67 on the one side and the oil pressure on the other. The piston 66 is shown as directly connected to the pins 43 which, as in Figure 3, are linked to the propeller blades to turn them. The pump 58, 59 is continuously driven and maintains in the pipe 60 a pressure determined by the by-pass load spring. A conduit 13, including a forked pipe, an annular channel between a stationary casing and a part rotating with the engine, and tunnels in this part and the engine shaft connects the piston valve with the cylinder 65. In the position of the valve shown in Figure 5 the pump circulates oil idly through the by-pass 61. If the primary member 6 shifts the valve to the left the delivery side of the pump is connected through the groove 63 in the piston with the cylinder 65; if the valve is moved to the right, the suction side of the pump is connected to the cylinder 65 through the groove 64.

Figure 6:
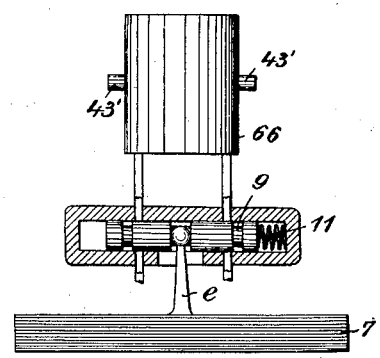
Figure 6 shows an alternative way of controlling the servomotor from the pitch-adjusting dynamo-electric machine.

Alternatively the secondary member of the machine 6, 7 may be employed to actuate the piston valve as indicated in Figure 6; in which case the primary member 6 is fixed as in Figure 1, and the secondary member carries the arm e operating the piston valve, which, with the pump, may conveniently be placed within the propeller hub.

The use of a servomotor reduces to a negligible amount the power taken from the network 12. But, if desired, the machine 6, 7 may be caused to return energy to the network. For example the piston valve may be loaded by a spring 11, as shown in Figures 5 and 6, so that it is always pressed towards the position for reducing the propeller pitch, and the machine 6, 7 may thus be caused to deliver energy into the network 12, at least to the extent of supplying the no load current of the generator of standard frequency.

It is obviously a matter of indifference whether the secondary of the pitch-adjusting dynamo-electric machine is driven by the screw shaft or by some other shaft rotating at a speed proportional to that of the screw. Its location next the screw or at the other end of the engine is a matter of convenience. Figure 8 for example shows the secondary member 7 on the engine crank shaft and the propeller driven through gearing, while in Figure 9 both the member 7 and the propeller are geared to the crank shaft.

Figure 7:
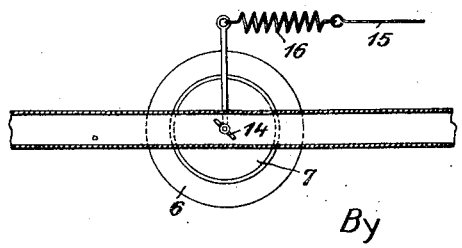
Figure 7 is an enlarged detail of an engine throttle control to be actuated by the generator of standard frequency.

The generator 50 may also control the engine fuel supply. For example, as shown in Figures 1 and 7, a throttle 14, manually controlled through the pull rod 15 and spring 16 may carry on its spindle the secondary member 7 of a dynamo-electric machine 6, 7, of which the primary is excited from the network 12 through individual switches 55 and 56 and a main switch 54. The secondary member 7 has only a limited rocking motion dependent on the magnetic torque between it and the primary member and the resistance of the spring 16. If this apparatus is put in action by the switches any variation in the frequency of the generator 50, or any reversal of the mains, will effect corresponding alteration of the throttle position, as is required, for instance, in changing from normal flight to gliding or braking. Alternatively the dynamo-electric machine controlling the throttle may be arranged after the fashion of Figure 4 with a rocking primary member and rotating secondary member driven from the engine. Normally the secondary member will turn in step with the rotating field of the primary member. If the standard frequency of generator 50 is increased there will be a torque on the primary member tending to open the throttle, so accelerating the engine to the new standard speed.

What I claim is:

1. In an apparatus for controlling the propellers of multiple propeller aircraft having a polyphase electric generator with means for driving said generator at constant speed and means for adjusting said speed of said generator and a pitch adjusting means for each propeller, a dynamo-electric machine for each propeller comprising relatively rotatable primary and secondary members, means for supplying said primary member with current from said generator to produce a rotating magnetic field therein, means for driving said secondary member with its corresponding propeller, mechanical means for applying the torque of said machine to operate said pitch adjusting means, engine controlling means for the engine of each propeller and means supplied by said generator for adjusting said engine controlling means in accordance with the speed of said generator.

2. In an apparatus for controlling the propellers of multiple propeller aircraft having a polyphase electric generator with means for driving said generator at constant speed and means for adjusting said speed with pitch adjusting means for each propeller, a dynamo-electric machine for each propeller comprising relatively rotatable primary and secondary members, means for supplying said primary member with current from said generator to produce a rotating magnetic field therein, means for creating in said secondary member a magnetic field rotating at a speed proportional to the speed of its corresponding propeller, mechanical means for applying the torque of said machine to operate the pitch adjusting means of its corresponding propeller, engine controlling means for the engine of each propeller and means supplied by said generator for adjusting said engine controlling means in accordance with the speed of said generator.

EDUARD SEPPELER.